Sept. 18, 1934.     O. H. HUNT     1,973,765
ELECTRICALLY OPERATED AUTOMATIC CONTROL APPARATUS
Filed Feb. 29, 1932
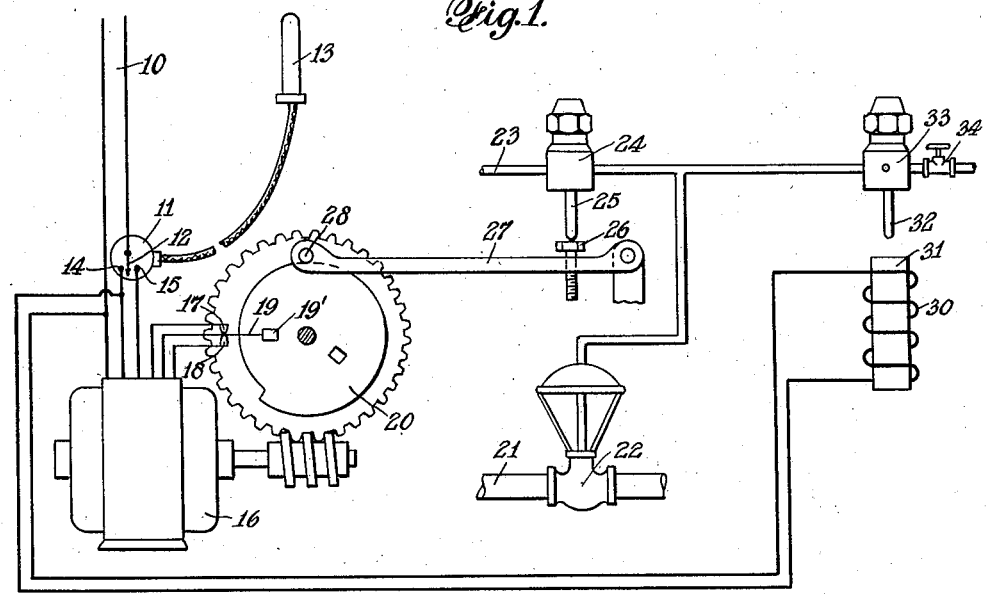
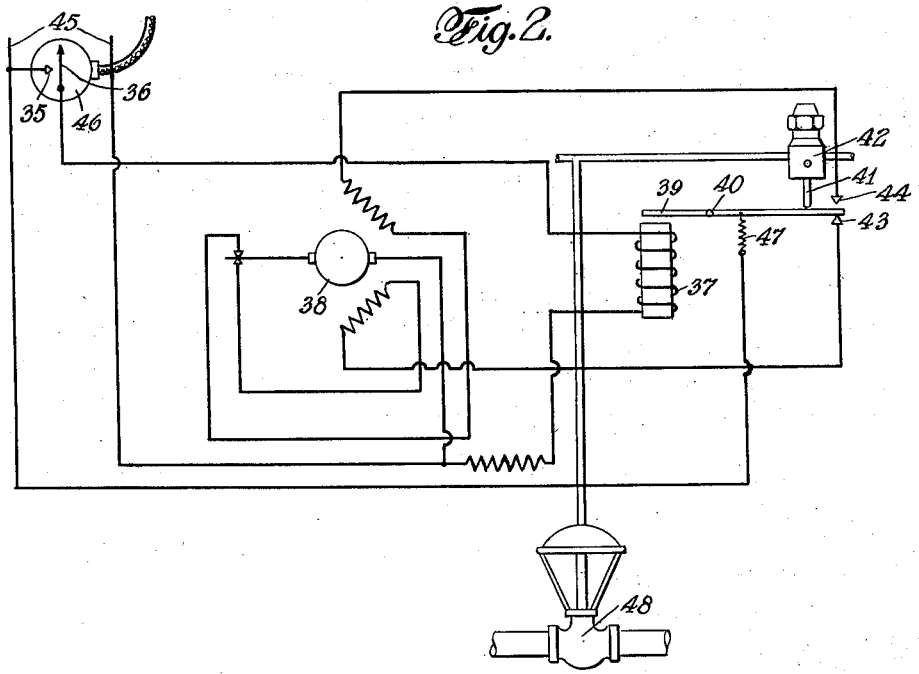
INVENTOR
*Ozro H. Hunt*
BY
ATTORNEY Patented Sept. 18, 1934

1,973,765

UNITED STATES PATENT OFFICE 1,973,765

ELECTRICALLY OPERATED AUTOMATIC CONTROL APPARATUS

Ozro H. Hunt, Waterbury, Conn., assignor to The Bristol Company, Waterbury, Conn., a corporation of Connecticut Application February 29, 1932, Serial No. 595,742

15 Claims. (Cl. 236—84)

The invention relates to the automatic, and preferably pneumatic, control and/or maintenance of certain physical conditions or quantities such as temperature, pressure or other quantity it may be desired to maintain at a predetermined state or to vary in a particular manner. In apparatus of this nature, a movable contact-making element of a controller device is actuated directly or indirectly from the condition to be automatically controlled, as through a member responsive thereto and connected with mechanism for operating the movable element of the contact-making controller. Such controller influences various apparatus to regulate a supply of medium in controlling a condition, as may be desired.

The present invention has for an object, in apparatus of this general nature, the provision of means whereby a closer control is possible, the same being attained by floating a regulating valve member for the maintaining medium rather than effecting either a full flow thereof or a complete cessation of such flow, as is the general practice.

Another object of the invention resides in the provision of means whereby the rate of control of the medium supply may be adjusted.

A further object of the invention resides in the provision of simple and effective means for accomplishing these results.

In carrying out the invention, use is made of a suitable cam member which is driven by a reversible electric motor provided, for example through the said cam, with limit devices for determining its maximum angular movement. The cam, furthermore, is arranged to influence mechanically a pilot valve or the like for regulating means controlling the supply of a fluid medium suitable for maintaining the desired condition.

This control of the fluid medium is attained through a fluid-pressure operated means or service valve, the arrangement of the cam control being such that a gradual regulation is afforded in accordance with a controller device actuated by means responsive to the condition to be controlled or maintained. Further means are provided for instantaneously effecting a rapid control of the pressure of the operating fluid for the fluid-pressure operated means, more particularly in reducing the same as through a leak-off valve also electrically controlled through the operation of the said controller device.

The nature of the invention, however, will best be understood when described in connection with the accompanying drawing, in which:

Fig. 1 is a more or less diagrammatic view illustrating the novel arrangement of apparatus and connecting electrical circuits.

Fig. 2 is a similar view illustrating a modification.

Referring to the drawing, 10 designates the mains for a suitable source of power supply (not shown), and 11 designates a controller device of any well-known or special design and embodying a movable contact-making element 12 operable by a responsive means, such, for example, as the thermo-sensitive element 13 to which the controller is connected. One of the leads 10 of the power supply is connected to this movable contact-making element 12 and is adapted for engagement respectively with the contacts 14 and 15 disposed upon opposite sides thereof.

A reversible motor 16 is designed to be connected to the mains 10 through a limit switch embodying the normally closed spring contacts 17 and 18 and whereby also the direction of rotation is influenced. This limit switch is controlled by engagement of an intermediate contact element 19 by a member or block 19' which is carried on a cam 20 driven from the motor.

In accordance with the direction of rotation of this cam, one of the contacts 17, 18 is separated from the other together with the intermediate contact element 19, which is connected to the common lead of the motor, and will thereby prevent further rotation in the particular direction in which the cam had been rotating.

The circumference of the cam member 20 is designed to provide a gradual regulation of a fluid medium for controlling or maintaining the desired condition, said medium being delivered through a pipe 21 in which is included the fluid-pressure operated regulating or service valve 22. Fluid for operating this valve is obtained through a pipe 23 from a suitable source of supply (not shown) as a compressed air reservoir or the like and is, in turn, under the control of a pilot valve 24 or the like. The stem 25 of this valve is adapted at its lower free end for engagement with a screw 26 adjustably threaded into a rocker arm 27 whose free end rides upon the periphery of the cam 20, as through a roller 28 carried at said end.

By this expedient, as the arm 27 is raised or lowered, in accordance with the particular position of the cam and as determined by its direction of rotation, the stem 25 will be lifted or depressed, more or less, to control the fluid medium supplied to valve 22, the transition from a fully closed to a substantially fully opened position thereof being gradual and as determined by the said cam 20 whose rotation is comparatively slow.

The valve disk or like control element of the valve 22 will thus be caused to float upon either side of the control point without particularly great variation. However, should appreciable variation occur therein, for example, such as to cause contact 14 to be engaged by the movable contact arm 12, provision is made for effecting a more rapid action of the valve 22.

For example, a circuit to a solenoid 30 may be arranged to be then energized from the mains 10 to effect thereby a movement of its plunger 31 upwardly to engage with a stem 32 of a further and leak-off valve 33 in communication with the discharge side of the pilot valve 24. This will cause a rapid discharge of the operating fluid from the valve 22 as in reducing the pressure thereon and will, in accordance with the setting of this valve, effect a fully opened or fully closed position thereof or a more rapid control of the same to meet the requirements.

The area of opening afforded by this leak-off valve 33 may be adjusted to various rates of discharge, being so proportioned to the corresponding area of the pilot valve 24 that the normal effect of the latter through the action of the cam will be accelerated to the desired degree. This is conveniently effected in providing a hand control valve 34 on the discharge side of valve 33.

Valve 22 is thus subject both to a gradual regulation and to a more rapid regulation, the latter being applicable simultaneously with the gradual control effected by the cam through the pilot valve 24 which in turn has a progressive effect on the leakage through valve 33. For example, when the leak-off valve 33 is operated upon energization of the solenoid through engagement between the low contact 14 and the movable arm 12, pressure is reduced upon the service valve 22 allowing the same to pass a greater volume of the medium controlled thereby and thus tend to restore normal conditions at an accelerated rate. The action of the cam 20 continues, however, gradually to increase the pressure of the control fluid from the pilot valve 24 cutting down thereby the supply of fluid medium controlled by valve 22 until normal conditions are restored.

In order to protect the delicate controller instrument contacts 35 and 36, reference being had to Fig. 2, from the constant make and break of the current in the motor circuit, provision may be made from the operation of the solenoid 37 to control this circuit for reversing the motor 38. For example, the solenoid may be provided with an armature 39 pivoted at 40 and spring-drawn away from the stem 41 of a leak-off valve 42. Valve 42 in this embodiment is then operated from the armature element through engagement of its one end with the stem 41, said armature end, moreover, being adapted to engage with a contact 43 or with a contact 44 located upon opposite sides of the armature, the armature in turn being connected to one of the leads 45 furnishing power to controller apparatus 46.

By this expedient, when the solenoid 37 is energized, contact 44 will be engaged to operate the motor in one direction, while when the circuit to the said solenoid is interrupted, the armature will be drawn downwardly under the action of a spring 47 to engage the contact 43 and cause the motor to be operated in the reverse direction, the circuits for these operations being clearly indicated in the drawing. The operation of the regulating valve 48 is otherwise similar to the action described in connection with the showing, Fig. 1 of the drawing.

I claim:

1. Apparatus for regulating a physical condition, comprising a reversible electric motor and cam element rotated thereby, a limit switch operated by the cam for controlling the angular movement of the cam in opposite directions, a controller device for initiating the operation of the motor, means operated by a fluid pressure for regulating the supply of a medium to control the condition, mechanical means controlled by the cam for varying the pressure of the operating fluid upon the fluid-pressure operated means in accordance with the position of the cam to afford a gradual control of the said fluid-pressure operated means, and electrically operated means for further and rapidly controlling the pressure of the operating fluid.

2. Apparatus for regulating a physical condition, comprising a reversible electric motor and cam element rotated thereby, a limit switch operated by the cam for controlling the angular movement of the cam in opposite directions, a controller device for initiating the operation of the motor, means operated by a fluid pressure for regulating the supply of a medium to control the condition, mechanical means controlled by the cam for varying the pressure of the operating fluid upon the fluid-pressure operated means in accordance with the position of the cam to afford a gradual control of the said fluid-pressure operated means, and electrically operated means for further and rapidly reducing the pressure of the operating fluid.

3. Apparatus for regulating a physical condition, comprising a reversible electric motor and cam element rotated thereby, a limit switch operated by the cam for controlling the angular movement of the cam in opposite directions, a controller device for initiating the operation of the motor, means operated by a fluid pressure for regulating the supply of a medium to control the condition, mechanical means controlled by the cam for varying the pressure of the operating fluid upon the fluid-pressure operated means in accordance with the position of the cam to afford a gradual control of the said fluid-pressure operated means, and electrically operated means for further and rapidly controlling the pressure of the operating fluid and under the control of the controller device.

4. Apparatus for regulating a physical condition, comprising a reversible electric motor and cam element rotated thereby, a limit switch operated by the cam for controlling the angular movement of the cam in opposite directions, a controller device for initiating the operation of the motor, a pilot valve for varying the pressure of the operating fluid upon the fluid-pressure operated means, means actuated by the cam for operating the pilot valve to afford a gradual control of said fluid-pressure operated means, and electrically operated means for further and rapidly controlling the pressure of the operating fluid.

5. Apparatus for regulating a physical condition, comprising a reversible electric motor and cam element rotated thereby, a limit switch operated by the cam for controlling the angular movement of the cam in opposite directions, a controller device for initiating the operation of the motor, means operated by a fluid pressure for regulating the supply of a medium to control the condition, mechanical means controlled by the cam for varying the pressure of the operating fluid upon the fluid-pressure operated means in accordance with the position of the cam to afford a gradual control of the said fluid-pressure operated means, a leak-off valve connected with the fluid pressure regulated means adapted to reduce the pressure of the operating fluid thereon, and electrical means for operating the leak-off valve.

6. Apparatus for regulating a physical condition, comprising a reversible electric motor and cam element rotated thereby, a limit switch operated by the cam for controlling the angular movement of the cam in opposite directions, a controller device for initiating the operation of the motor, means operated by a fluid pressure for regulating the supply of a medium to control the condition, mechanical means controlled by the cam for varying the pressure of the operating fluid upon the fluid-pressure operated means in accordance with the position of the cam to afford a gradual control of the said fluid-pressure operated means, a leak-off valve connected with the fluid pressure regulated means adapted to reduce the pressure of the operating fluid thereon, means to adjust the extent of the leakage through said leak-off valve, and electrical means for operating the leak-off valve.

7. Apparatus for regulating a physical condition, comprising a reversible electric motor and cam element rotated thereby, a limit switch operated by the cam for controlling the angular movement of the cam in opposite directions, a controller device for initiating the operation of the motor, means operated by a fluid pressure for regulating the supply of a medium to control the condition, mechanical means controlled by the cam for varying the pressure of the operating fluid upon the fluid-pressure operated means in accordance with the position of the cam to afford a gradual control of the said fluid-pressure operated means, a leak-off valve connected with the fluid-pressure regulated means adapted to reduce the pressure of the operating fluid thereon, and a solenoid having a plunger adapted for engagement with the leak-off valve to open the same when the solenoid is energized.

8. Apparatus for regulating a physical condition, comprising a reversible electric motor and cam element rotated thereby, a limit switch operated by the cam for controlling the angular movement of the cam in opposite directions, a controller device for initiating the operation of the motor, means operated by a fluid pressure for regulating the supply of a medium to control the condition, mechanical means controlled by the cam for varying the pressure of the operating fluid upon the fluid-pressure operated means in accordance with the position of the cam to afford a gradual control of the said fluid-pressure operated means, a leak-off valve connected with the fluid-pressure regulated means adapted to reduce the pressure of the operating fluid thereon, a solenoid having a plunger adapted for engagement with the leak-off valve to open the same when the solenoid is energized, and a circuit-closing member operable by the solenoid for closing the electric circuits to the motor to operate the same respectively in opposite directions.

9. Apparatus for regulating a physical condition, comprising a reversible electric motor and cam element rotated thereby, a limit switch operated by the cam for controlling the angular movement of the cam in opposite directions, means operated by a fluid pressure for regulating the supply of a medium to control the condition, mechanical means controlled by the cam for varying the pressure of the operating fluid upon the fluid-pressure operated means in accordance with the position of the cam to afford a gradual control of said fluid-pressure operated means, a leak-off valve connected with the fluid-pressure regulated means adapted to reduce the pressure of the operating fluid thereon, a solenoid having a plunger adapted for engagement with the leak-off valve to open the same when the solenoid is energized, a circuit closing member operable by the solenoid for closing the electric circuits to the motor to operate the same respectively in opposite directions, and a controller device for initiating the operation of the solenoid.

10. Apparatus for regulating a physical condition, comprising a reversible electric motor and cam element rotated thereby, a limit switch operated by the cam for controlling the angular movement of the cam in opposite directions, a controller device for initiating the operation of the motor, a pilot valve, a rocker arm having its outer end engaged by the cam, means connected with the pilot valve for engagement with said rocker arm to control the delivery of fluid by said pilot valve to the fluid-pressure operated means to afford a gradual reduction of said fluid-pressure operated means, and electrically operated means for further and rapidly controlling the pressure of the operating fluid.

11. Apparatus for regulating a physical condition, comprising a reversible electric motor and cam element rotated thereby, a limit switch operated by the cam for controlling the angular movement of the cam in opposite directions, a controller device for initiating the operation of the motor, a pilot valve for varying the pressure of the operating fluid upon the fluid-pressure operated means, means actuated by the cam for operating the pilot valve to afford a gradual control of said fluid-pressure operated means, a leak-off valve, means affording permanent communication between said leak-off valve and the said pilot valve, a connection between said communicating means and the fluid-pressure operated means affording a permanent communication therebetween, and means for operating the leak-off valve.

12. In an automatic control system: a valve for regulating the flow of a fluid control medium, electromechanical means for operating the valve in either direction at a relatively low velocity, a second valve for bleeding the fluid control medium supplied by the first valve, and further means operative concurrently with the electromechanical means for actuating said second valve at a relatively high velocity.

13. In automatic control system: a source of control fluid supply, means operated by the fluid to control a condition, a valve operative in either direction in response to the condition for varying gradually the pressure of the supplied control fluid upon the fluid-pressure operated means in accordance with the variations in the condition to afford a gradual control of the fluid operated means, and an additional valve also subject to the condition and arranged to bleed a portion of the control fluid for further and rapidly controlling the pressure thereof as applied to the fluid-operated means.

14. In an automatic control system: a valve for regulating the flow of a fluid control medium, a reversible electric motor and cam element movable thereby, a controller device for initiating operation of the motor, means operated by the fluid control medium for regulating the supply of a medium to control a condition, means controlled by the cam for operating in either direction the regulating valve to gradually vary the pressure of the fluid control medium upon the fluid operated means, and means operative concurrently therewith and arranged to bleed a portion of the control fluid for further and rapidly controlling the pressure thereof as applied to the fluid-operated means.

15. In an automatic control system: a valve for regulating the flow of a fluid control medium, a reversible electric motor and cam element movable thereby, a controller device for initiating the operation of the motor, means operated by the fluid control medium for regulating the supply of a medium to control a condition, means controlled by the cam for operating in either direction the regulating valve to gradually vary the pressure of the fluid control medium upon the fluid operated means, and electromagnetic means operative concurrently therewith and arranged to bleed a portion of the control fluid for further and rapidly controlling the pressure thereof as applied to the fluid-operated means.

OZRO H. HUNT.